Figure 1:
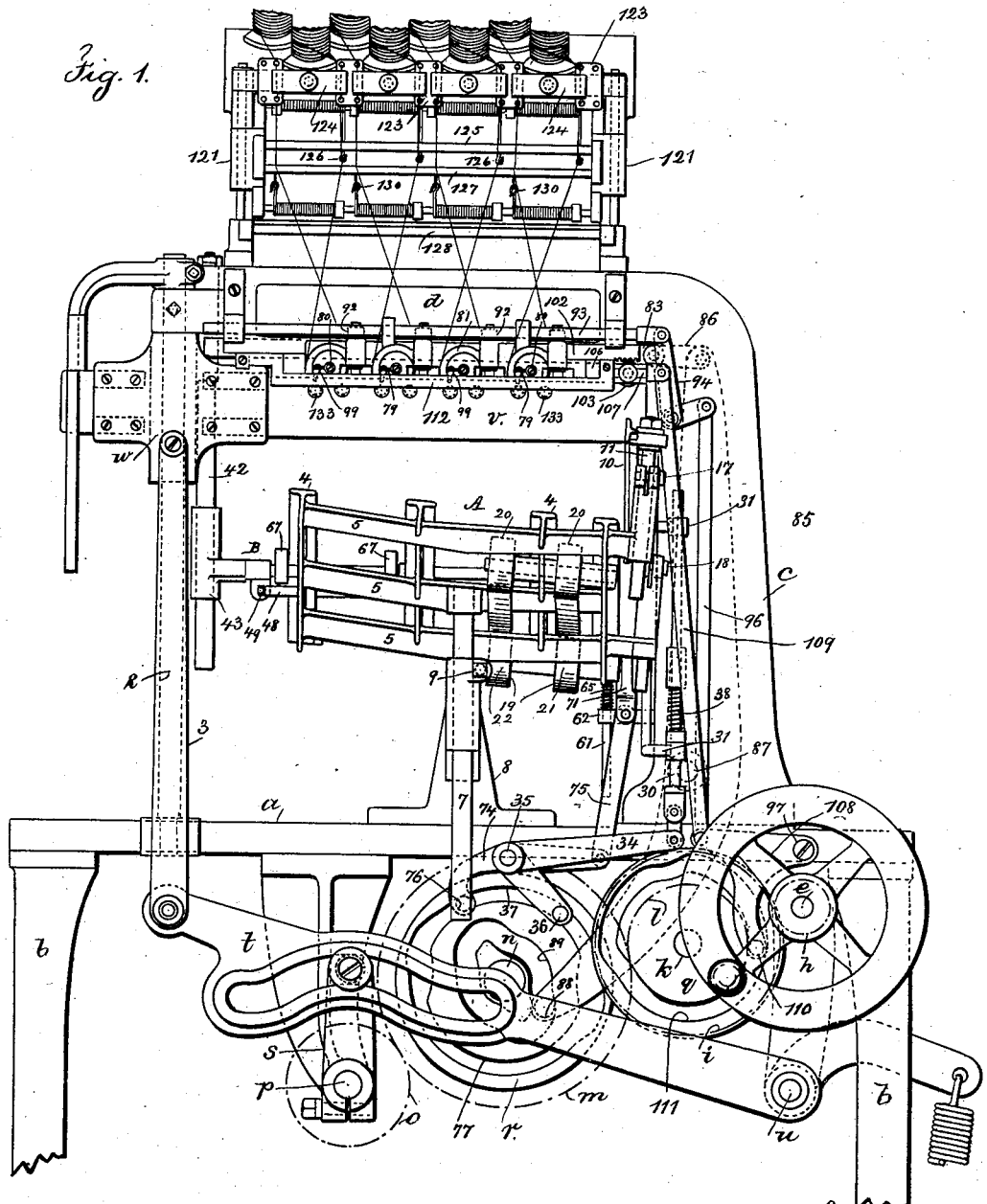

No. 735,606. PATENTED AUG. 4, 1903.
D. McC. & D. G. SMYTH & H. HASTINGS.
BOOK SEWING MACHINE.
APPLICATION FILED SEPT. 26, 1901. RENEWED MAY 27, 1903.
NO MODEL.
6 SHEETS—SHEET 1.

Witnesses
Chas H Smith
J. Staib

Inventors
David M. Smyth
David G. Smyth
Herbert Hastings

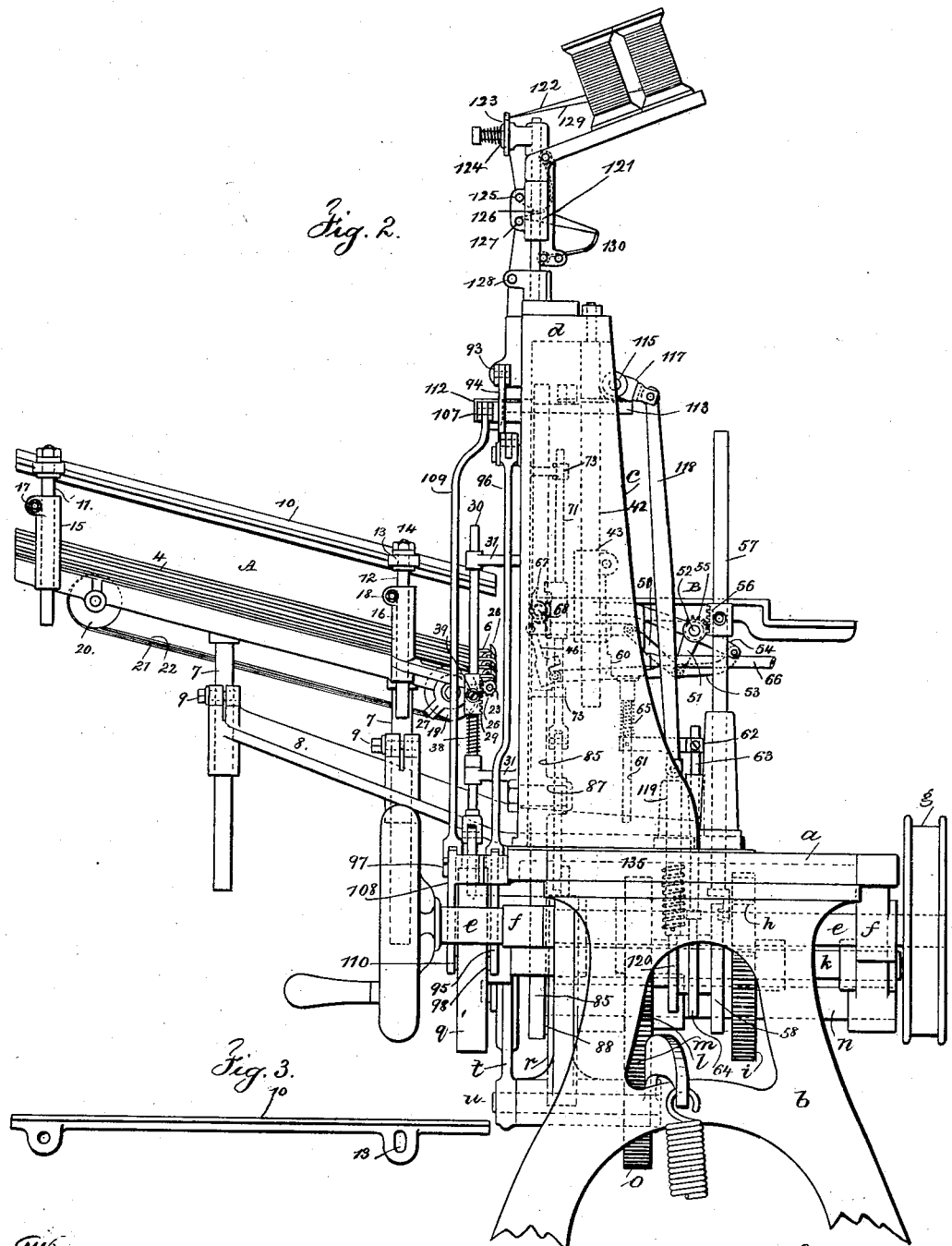

No. 735,606. PATENTED AUG. 4, 1903.
D. McC. & D. G. SMYTH & H. HASTINGS.
BOOK SEWING MACHINE.
APPLICATION FILED SEPT. 26, 1901. RENEWED MAY 27, 1903.
NO MODEL. 6 SHEETS—SHEET 3.
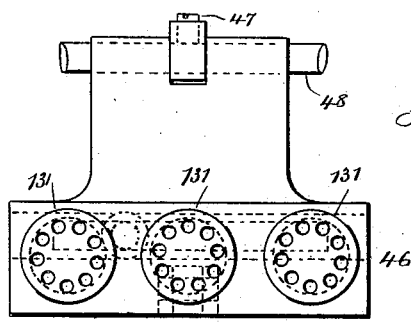
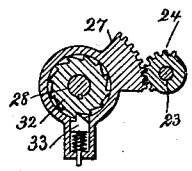
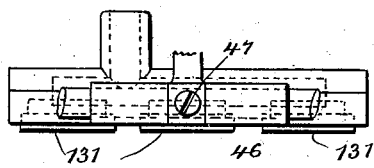
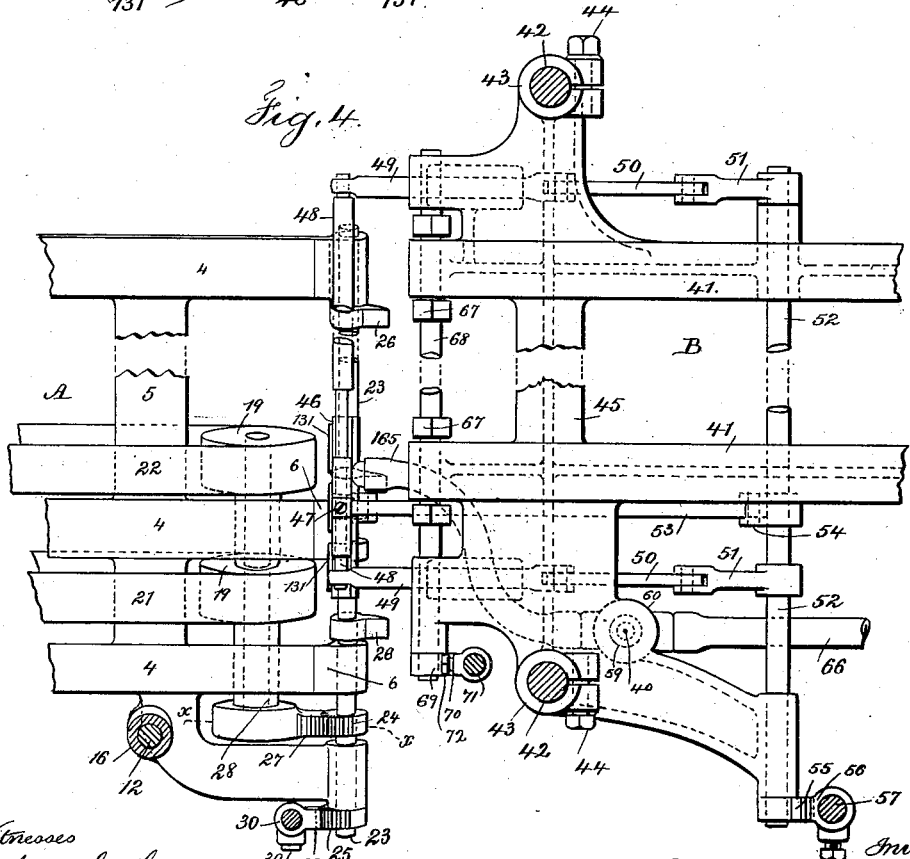

No. 735,606. PATENTED AUG. 4, 1903.
D. McC. & D. G. SMYTH & H. HASTINGS.
BOOK SEWING MACHINE.
APPLICATION FILED SEPT. 26, 1901. RENEWED MAY 27, 1903.
NO MODEL. 6 SHEETS—SHEET 4.
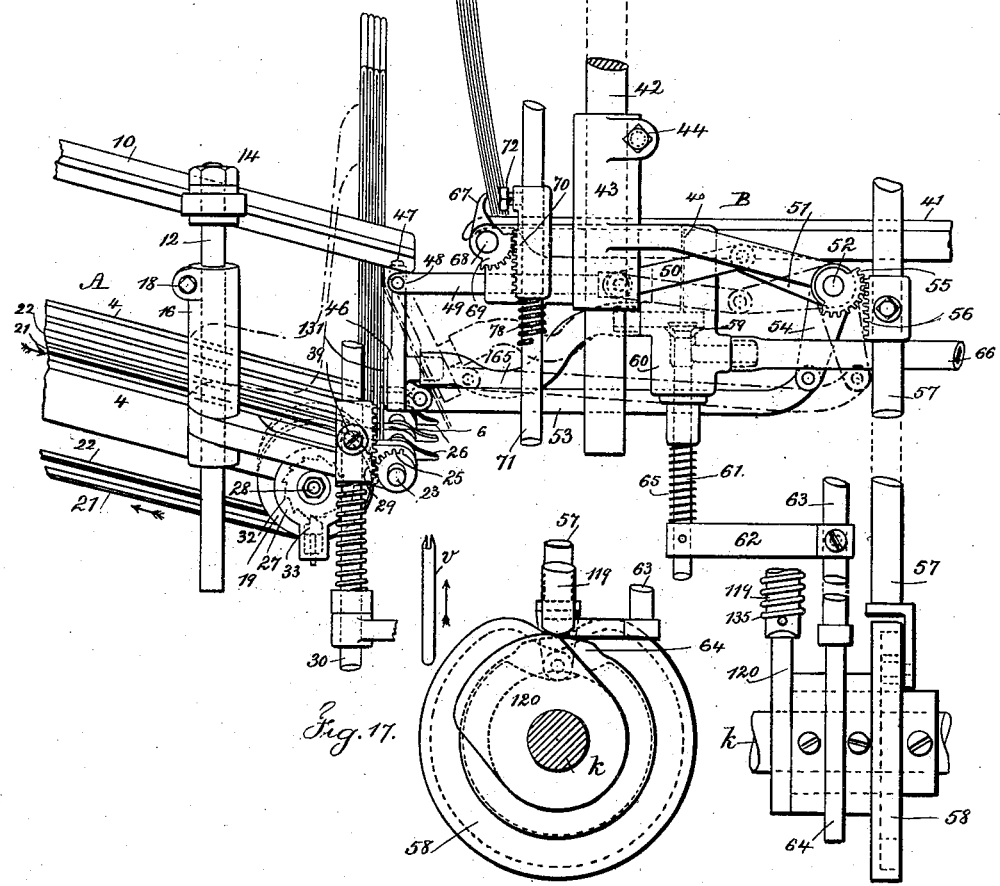
Witnesses
Chas. H. Smith
J. Staib
Inventors
David M. Smyth.
David G. Smyth.
Herbert Hastings.
for L. W. Serrell & Son attys

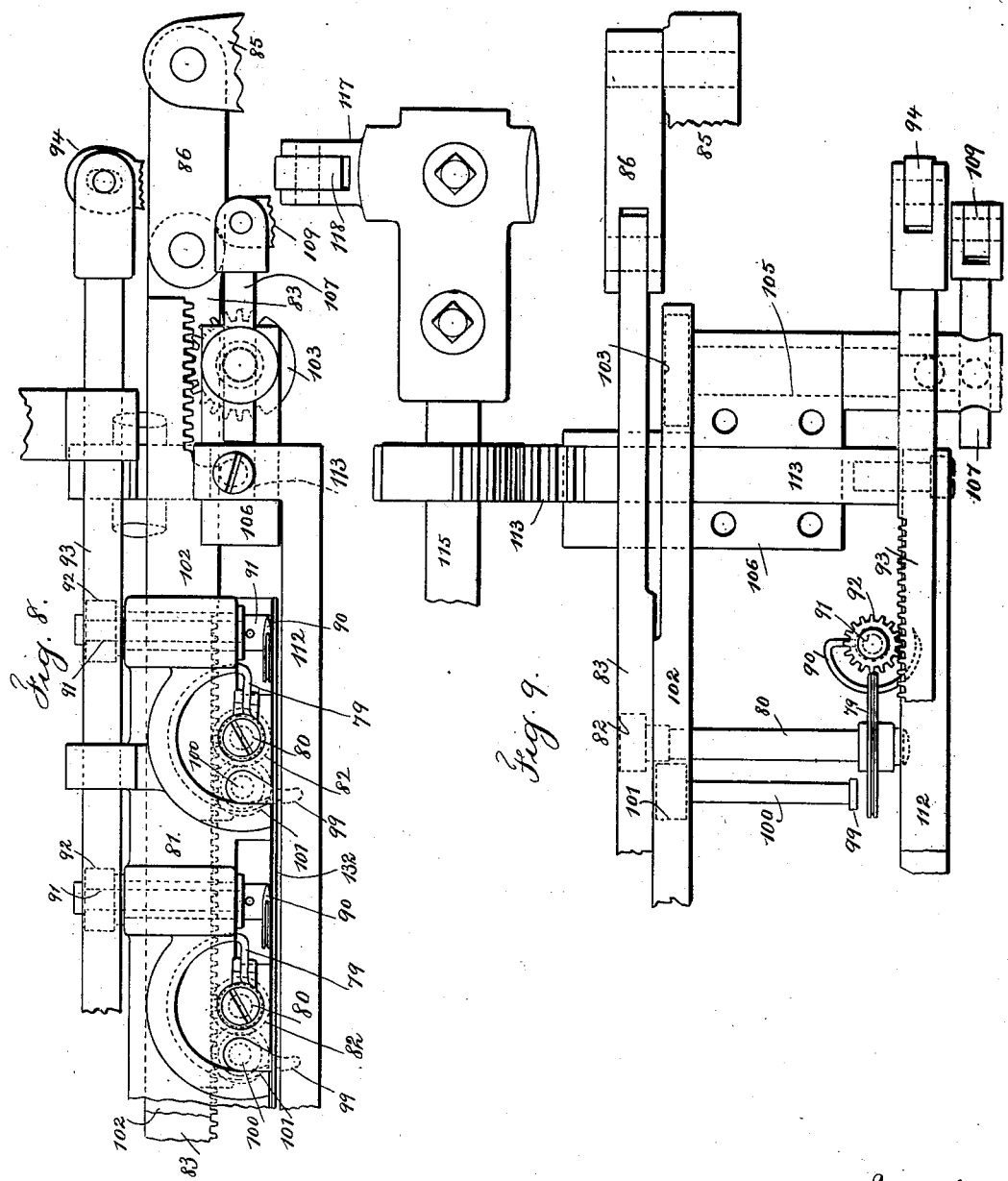

No. 735,606. PATENTED AUG. 4, 1903.
D. McC. & D. G. SMYTH & H. HASTINGS.
BOOK SEWING MACHINE.
APPLICATION FILED SEPT. 26, 1901. RENEWED MAY 27, 1903.
NO MODEL. 6 SHEETS—SHEET 6.
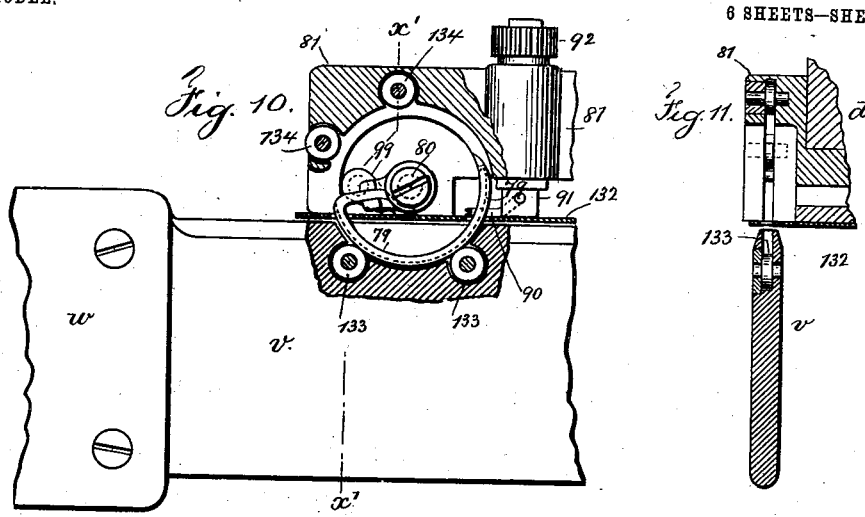
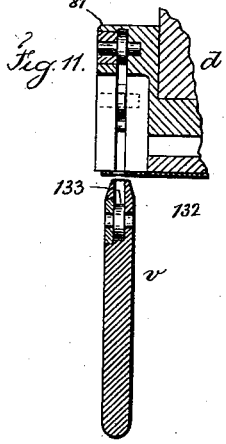
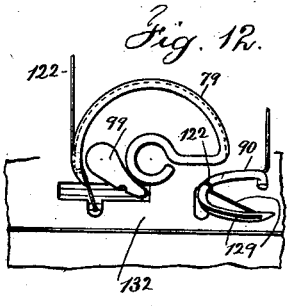
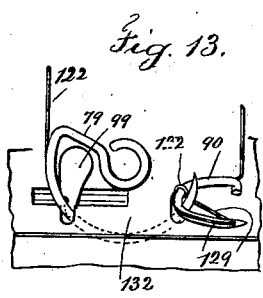
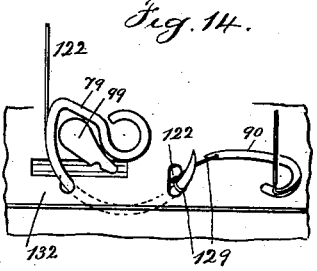
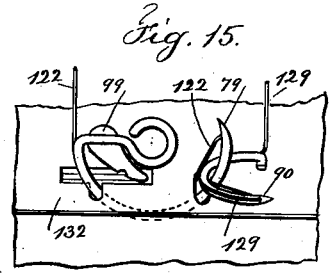
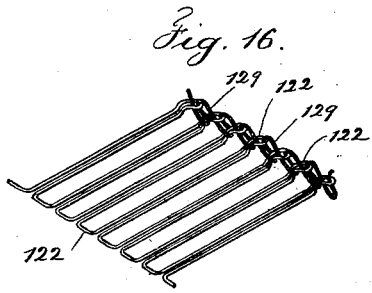
Witnesses
Chas H. Smith
J. Staib
Inventors
David M. Smyth
David G. Smyth
Herbert Hastings
per L. W. Serrell & Son
atty No. 735,606. Patented August 4, 1903.

UNITED STATES PATENT OFFICE.

DAVID McCONNELL SMYTH, OF PASADENA, CALIFORNIA, DAVID G. SMYTH, OF HARTFORD, CONNECTICUT, AND HERBERT HASTINGS, OF ORANGE, NEW JERSEY, ASSIGNORS TO SMYTH MACHINE COMPANY, OF HARTFORD, CONNECTICUT, A CORPORATION OF ARIZONA TERRITORY.

BOOK-SEWING MACHINE.

SPECIFICATION forming part of Letters Patent No. 735,606, dated August 4, 1903.

Application filed September 26, 1901. Renewed May 27, 1903. Serial No. 159,046. (No model.)

*To all whom it may concern:*

Be it known that we, DAVID MCCONNELL SMYTH, of Pasadena, in the county of Los Angeles and State of California, DAVID G. SMYTH, of Hartford, in the county of Hartford and State of Connecticut, and HERBERT HASTINGS, of Orange, in the county of Essex and State of New Jersey, citizens of the United States, have invented new and useful Improvements in Feeding Mechanism for Book-Sewing Machines, of which the following is a specification.

The present invention is an improvement upon that set forth in an application for patent filed by said David M. Smyth January 30, 1899, Serial No. 703,812. In the machine shown in said application the receptacle into which the signatures to be sewed are placed is inclined toward the delivery edge of said receptacle and also inclined toward the side of the receptacle against which the folded top edges of the signatures rest, and endless belts are used to aid in feeding forward the signatures in said receptacle. We make use of a receptacle and endless belts similar to those set forth in said application; but we employ different means for actuating said belts, which means also operate fingers that hold back the signatures in said receptacle. Our invention also relates to means for operating the sucker, so that said sucker bends out the outer folded portion of the signature, while the upper part of the signature is held back by the top of the sucker and its pivot-rod. At the same time the other half of the folded signature at its lower portion is held back by fingers. Thereby the two parts of the signature are in a position for the signature-bar to freely enter between said folded parts.

In the drawings, Figure 1 is an elevation of the front of the machine. Fig. 2 is a side elevation of the same. Fig. 3 is a plan view of the guide-rail of the signature-receptacle. Fig. 4 is a plan view, partly in section, of part of the signature-receptacle and the table or galley upon which the sewed signatures are received. Fig. 5 is a diagrammatic view showing an elevation of part of the signature-receptacle and its parts, the table upon which the sewed signatures are received, and its connected parts, and a section through the needle-block and head of the machine. Fig. 6 is an elevation, and Fig. 7 a plan view, of the sucker. Fig. 8 is an elevation of the needle-block disconnected from the head of the machine, showing two sets of sewing appliances and the means for operating the same. Fig. 9 is a plan view of some of the parts shown in Fig. 8. Fig. 10 is an elevation, partly in section, of part of the needle-block and signature-bar, illustrating how the sewing-needle is supported while piercing the signature. Fig. 11 is a vertical cross-section at the line $x'\,x'$ of Fig. 10. Figs. 12, 13, 14, and 15 are views illustrating the manner of forming the stitch. Fig. 16 represents the stitch made, the threads not being drawn taut for better illustration. Fig. 17 is an elevation of the cams shown in Fig. 5, and Fig. 18 is a section at about the line $x\,x$ of Fig. 4.

$a$ represents the bed of the machine, and said bed is supported by the legs or standards $b\,b$.

$c$ is a frame rising from and bolted to the bed $a$, and said frame has a horizontal portion or head $d$ for supporting the sewing mechanism and other parts hereinafter described.

$e$ is the driving-shaft in bearings $f\,f$ upon the under side of the bed $a$, and at one end of said shaft there is a pulley $g$ for a driving-belt, and at the other end of said shaft $e$ there is a wheel and handle, by which said shaft may be turned by hand when the power is disconnected from the machine.

$h$ is a pinion upon the shaft $e$, gearing into a wheel $i$ upon a shaft $k$, and upon said shaft $k$ is a wheel $l$, gearing into a wheel $m$ upon a shaft $n$, and the wheel $m$ gears into a wheel $o$ upon a shaft $p$. The shafts $k$, $n$, and $p$ are supported by brackets upon the under side of the bed $a$, and upon the shafts $k$ and $n$ there are cam-disks $q$ and $r$, hereinafter referred to, and upon the shaft $p$ there is a crank $s$, having a roller at its end passing into a cam-slot in a lever $t$, pivoted at $u$ to an arm extending downward from one of the bearings $f$. The lever $t$ gives movement to a signature-holding bar $v$, and said bar is firmly secured to a head $w$, that is fitted to slide vertically upon a bar or rod 2, that is supported at its lower end in the bed $a$ and at its upper end in the head $d$. A link 3 connects the lever $t$ with the head $w$, and the cam-slot in the lever $t$ is of such shape that during each revolution of the crank-arm $s$ said signature-holding bar is first raised vertically, and during its upward movement said bar takes a signature and carries it upward to the place where the sewing is performed. Then said bar is held stationary during the sewing operation, and after the sewing operation said bar is lowered out of the sewed signature the required distance and then raised again, as before.

*Means for feeding the signatures to the signature-bar.*—The signature galley or receptacle A, into which the signatures to be sewed are placed, is similar to that set forth in said application Serial No. 703,812. The bottom is preferably a casting composed of a number of T-shaped bars 4, connected by webs or bars 5, and said bars are inclined downwardly toward the place where the signatures are taken by the signature-bar, as seen in Fig. 2, so that gravity may assist in feeding said signatures, and the end portions of the bars adjacent to the place of delivery are horizontal, as shown at 6, Fig. 5, so as to slightly check the forward movement of the signatures as they pass down the inclined bars 4. 7 7 are vertical rods secured to the under side of the signature-receptacle, and these rods each pass into a tubular socket upon an arm 8, that is bolted to the bed $a$. 9 9 are bolts for clamping the rods 7 7 in said sockets after the signature-receptacle has been adjusted vertically to the desired position. The signatures to be sewed are placed in the receptacle with their folded back portions upward and with their folded top portions resting against a guide-rail 10. Said guide-rail is supported at one end by a post or rod 11, which rod also forms a pivot on which the guide-rail may be swung. The other end of said rail 10 is supported by a post or rod 12, and said rail is provided with an elongated hole at 13 (see Fig. 3) for the upper end of said post 12 to pass through, and thereby allow of the rail being moved upon its pivot 11 to adjust the inner end of said rail, and thereby bring the signatures into the proper position with respect to the sewing-needles.

14 is a nut for clamping the rail 10 after it has been adjusted to position.

The posts 11 and 12 are fitted to slide vertically in tubular sockets 15 and 16, formed with or attached to the signature-receptacle, so as to allow for the vertical adjustment of the rail 10, and said posts are clamped in the sockets by the screw-bolts 17 and 18. The signature-receptacle A is inclined downwardly toward the rail 10, so that the signatures will tend to bear against said rail and also so that the delivery edge of the signature-receptacle will stand at an inclination to the horizontal signature-bar in order that said bar may first enter the lower corner of the folded top edge of the signature, as hereinafter explained.

19 and 20 are pairs of pulleys upon shafts supported in bearings in the bars 4, and around said pulleys are endless belts 21 22. The outer surfaces of said belts as the belts travel come slightly above the surface of the bars 4, and the front cut edges of the signatures rest upon said belts. Hence each progressive movement of the belts gives a forward movement to the signatures in the receptacle. Said belts and pulleys are the same as in said application; but the means for giving the progressive movement to the belts are different, as next described.

*Means for giving a progressive movement to the feed-belts.*—23, Figs. 2, 4, and 5, is a shaft supported in bearings at the delivery end of the bars 4, and in an arm projecting from one of said bars and upon said shaft are securely fixed the toothed segments 24 and 25 and signature-holding fingers 26. The segment 24 meshes with a toothed segment 27 on the shaft 28 of the pulleys 19, and the toothed segment 25 meshes with a rack 29, that is adjustably secured to a vertical rod 30, that is supported and guided by arms 31 31, secured to the frame $c$. The toothed segment 27 is loose upon the shaft 28, and upon said shaft there is a fixed ratchet-wheel 32, (see Figs. 5 and 18,) that occupies a circular recess in said segment, and 33 is a spring-pawl engaging said ratchet-wheel, said pawl being upon a stem fitted to slide in a projecting portion of the segment 27. It is now to be understood that when the rod 30 is moved downward the rack 29, acting upon the toothed segment 25, turns the shaft 23 and toothed segment 24, and this latter turns the toothed segment 27 and by the pawl 33 turns the ratchet-wheel 32, shaft 28, and pulleys 19, and the belts 21 and 22 receive a movement in the direction of the arrows, Fig. 5, and move the signatures a slight distance forward toward the delivery end of the bars 4. When the rod 30 is moved upward, the rack 29 turns the segment 25, shaft 23, and segment 24 in the reverse direction; but the shaft 28 is not rotated, because the pawl 33 rides over the teeth of the ratchet 32. Hence the pulleys 19 and endless belts 21 and 22 remain stationary during the upward movement of the rod 30. The rod 30 is connected to a lever 34, pivoted at 35 to the bed $a$, (see Fig. 1,) and upon said lever there is a roller 36, that is kept in contact with the cam portion 37 in the outer face of the disk $r$ by a spring 38 around the rod 30, and said cam portion 37 gives the up-and-down movement to said rod at the proper time. The rack 29 is adjustably secured to the rod 30 by the screw 39, so that in case the signature-receptacle is raised or lowered, as before described, the rack may be also raised or lowered upon said rod 30, so that it will mesh properly with the toothed segment 23.

The fingers 26, before referred to, are firmly secured to the shaft 23 and turn with the same, and when said fingers are in the position shown in Fig. 2 they bear against the front signature of the signatures in the receptacle and prevent the signatures passing off the bars 4; but when the rod 30 is moved upward, as before described, the fingers are swung into the position shown in Figs. 4 and 5, so that the sucker, hereinafter described, may bend out the outer folded part of the front signature to allow the signature-bar to pass between the two parts of the signature; but said fingers are returned to the position shown in Fig. 2 by the downward movement of the rod 30 before the signature-bar passes between the two parts of the signature, and it is during this latter or return movement of said fingers that the movement is given to the feed-belts 21 22, before described.

*Means for taking the signatures from the signature-receptacle.*—The discharge galley or table B, Figs. 2, 4, and 5, upon which the sewed signatures are passed one by one as they are sewed, is preferably a casting having a number of bars 41, upon which the front cut edges of the signatures rest, and said bars are connected by a web or bar 45. Said table is supported from the head $d$ by the vertical rods 42 42, which pass through tubular split sockets 43 43 upon said table, and the sockets are clamped to said rods by the screw-bolts 44 44.

46 is a sucker clamped by a screw 47 to a rod 48, and said rod has pivot ends, which pass into holes in the outer ends of bars 49 49, that are fitted to slide horizontally in guides in the table B. The slide-bars 49 49 are connected by links 50 to crank-arms 51 upon a rock-shaft 52, that is fitted to turn in bearings upon the table B.

53 is a link pivoted at one end to the lower part of the sucker 46, and at the other end said link is pivoted to a crank-arm 54 upon the rock-shaft 52.

55 is a toothed segment secured to the rock-shaft 52 and meshing with a rack 56, adjustably secured to a rod 57, that is fitted to move vertically in a suitable guide upon the bed $a$, and said rod 57 receives its movement from a cam 58 on the shaft $k$.

59, Fig. 5, is a valve in a cylinder 60, said cylinder being preferably integral with the table B, and said valve is at the upper end of a valve-rod 61, and said valve-rod is connected by an arm 62 to a vertical rod 63, that is fitted to slide in a guide on the bed $a$. A cam 64 on the shaft $k$ acts upon the rod 63 at the proper time to raise the valve from its seat, and there is a spring 65 around the rod 61 between the arm 62 and the lower part of the cylinder 60, which spring forces down the rods 61 and 63 and arm 62 and closes the valve upon its seat when permitted to do so by said cam 64. There is a vent or small passage-way at 40 in the cylinder 60 to admit air and break the partial vacuum in the sucker when the valve closes upon its seat.

*The sucker.*—The sucker 46, Figs. 6 and 7, is preferably a hollow casting of rectangular shape having circular openings in its front face, and in these openings there are disks of rubber 131, the outer faces of which project slightly beyond the front face of the casting, so that said outer faces of the rubber disks shall contact with the signature in taking the same from the signature-receptacle. The rubber disks 131 have numerous perforations through them that open into the hollow portion of the sucker, and there is an arm rising from the top of the sucker, which arm is perforated horizontally for the pivot-rod 48, which is clamped to said arm by the screw 47, before referred to, so as to allow for adjusting the sucker upon said pivot-rod. A flexible pipe 165 is connected to said sucker 46 and to the valve-cylinder 60, and a pipe 66, leading from an air-pump, (not shown in the drawings,) is also connected to said valve-cylinder.

*Fingers for pushing the lower part of the sewed signatures upon the table.*—67 represents fingers secured to a rock-shaft 68, fitted to turn in bearings upon the table B, and these fingers act upon the lower part of the signatures as they are sewed, successively, and push said lower parts of the signatures back upon the bars 41 of the table.

69 is a toothed segment fastened to the rock-shaft 68, and said toothed segment meshes with a rack 70, adjustably secured to the vertical rod 71 by a clamping-bolt 72, and this rod is guided by bracket-arms 73, projecting from the frame $c$. (See dotted lines, Fig. 2.) The rod 71 is connected to a bent lever 74 by a link 75, (see Fig. 1,) and said lever is pivoted upon the stud 35, and at the free end of said lever there is a roller 76, that is kept in contact with the cam portion 77 of the disk $r$ by a spring 78 (see Fig. 5) around the rod 71, which spring acts between the rack 70 and one of the arms 73. Said cam portion 77 acting through the devices last mentioned operates the fingers 67, as hereinafter described.

*Operation of the devices for taking the signatures from the signature-receptacle.*—Starting with the parts in the position shown in Fig. 2, in which the sucker is at the end of its back movement, the cam 58 in its revolution draws down the rod 57, and by the rack 56 and toothed segment 55 the rock-shaft 52 is turned and swings the arms 51 51, and said arms acting through the links 50 50 move forward the slide-bars 49 49 and the sucker 46 and its pivot-shaft 48, carried by said rods. The rock-shaft 52 also swings the arm 54, and the latter acting through the link 53 swings the sucker so that its outer face is brought parallel with the signatures by the time the sucker reaches its extreme forward movement, as shown in Fig. 5. The signatures upon the receptacle A are moved back a short distance by the pivot-rod 48 and upper part of the sucker during the latter part of said forward movement of the sucker. As the sucker comes into contact with the signature to be taken away the cam 64, acting through the rods 63 and 61, lifts the valve 59 from its seat in the cylinder 60 and opens a passage between the pipes 65 and 66 and allows the exhaust to act in the sucker. By inspection of Fig. 5 it will be seen that when the sucker is at its extreme forward movement the pivotal connections between the links 50 and the arms 51 are above a line drawn from the center of the rock-shaft 52 to the pivotal connections of the links 50 with the slide-bars 49. Hence when the cam 58 moves the rod 57 upward to give the return movements to the parts and draw back the sucker the upper part of the sucker and the pivot-rod 48 remain almost stationary against the signatures while the arms 51 and links 50 are moving from the position shown by full lines in said Fig. 5 until said rods 49, links 50, and arms 51 are in line with each other and slightly past said line, and during said movement the sucker is swung by the arm 54 and link 53, and said sucker bends out and carries with it that portion of the outer folded half of the signature that is below the pivot-rod 48, as shown by dotted lines in Fig. 5. It is to be understood that the fingers 26 are swung from the position shown in Fig. 2 to that shown in Fig. 5 before the sucker reaches the position shown by full lines in Fig. 5, so as to allow the outer folded half of the signature to be taken by the sucker, as aforesaid; but said fingers are almost immediately returned to the position shown in Fig. 2, so as to press back the inner folded half of the signature and keep it out of the way of the signature-holding bar $v$ as it rises, and thereby allow said signature-holding bar to pass freely between the two parts of the signature. The sucker 46 is moved back with the slide-bars 49 after it has reached the position shown by dotted lines in said Fig. 5, and the signature-holding bar $v$ rises within the folded signature as said sucker draws back, the suction being taken off before the signature-holding bar reaches the fold of the signature, and when the signature-holding bar reaches said fold said bar lifts the signature and carries it up to the place where the sewing is performed, as hereinafter described. The fingers 26 do not press upon the inner folded half of the signature with much force. Hence they offer no obstruction to the lifting of the signature by the signature-holding bar. As before mentioned, the signatures stand in the receptacle with their front cut edges resting upon the bottom of said receptacle and with their folded top edges resting against the guide-rail 10. The sucker is placed so that it acts upon the signature at the lowest corner of said signature—viz., where the folded top edges join the front cut edges. Hence when this portion of the outer half of the folded signature is bent out by the sucker and the other half of the signature is held back by the fingers 26 the signature-holding bar will always pass between the two parts of the signature.

*Devices for operating the sewing-needles.*—The semicircular eye-pointed sewing and piercing needles 79 are each clamped to a horizontal shaft 80, fitted to turn in a needle-block 81, and this latter is firmly secured to the head $d$. Upon each shaft 80 there is a pinion 82, and each pinion meshes with a rack-bar 83, that is common to all the pinions 82. Said rack-bar is suitably guided in blocks 106 and 114, secured to the head $d$, and it is connected to a lever 85 by a link 86, which lever is pivoted at 87 (see Figs. 1 and 2) to the frame $c$. There is a roller 88 at the free end of said lever 85, and this roller 88 is in a cam-goove 89 in the face of the disk $r$ upon the shaft $n$, and said cam-groove is so shaped as to give to the needles 79 the movements hereinafter described.

*Devices for operating the loopers.*—90 represents the loopers that act in connection with the sewing-needles in performing the sewing. Each looper is made as a semicircular eye-pointed needle and is at the lower end of a vertical shaft 91, that turns in a bearing in the needle-block 81, and said looper moves in a plane at right angles to the path of the sewing-needles 79. At the upper end of each looper-shaft 91 there is a pinion 92, that meshes with a rack-bar 93, that is common to all the pinions 92, and said rack-bar 93 is connected to one end of a bent lever 94, and the other end of said lever is connected with a lever 95 by a link 96. (See Figs. 1 and 2.) The lever 95 is pivoted at 97 to the bed $a$, and said lever has a roller 98, that passes into a cam-groove cut in the rear face of the disk $q$ on the shaft $k$, and said cam-groove is properly shaped to give the movements hereinafter described to the loopers 90.

*Devices for operating the take-up finger of the sewing-needles.*—99 represents fingers that take up the slack thread of the sewing-needles 79, and they also when in the position shown in Fig. 8 hold the signature last sewed until the next signature is brought to place. Said fingers 99 are each secured to a shaft 100, fitted to turn in the needle-block 81, and upon each shaft there is a pinion 101, that meshes with a rack-bar 102, guided in the blocks 106 and 114 of the head $d$, and said rack-bar is common to all the pinions 101.

103 is a pinion upon a shaft 105, fitted to turn in the block 106, and said pinion meshes with teeth upon the rack-bar 102, as shown in Fig. 8, and 107 is a crank-arm secured to said shaft. The crank-arm 107 is connected with a lever 108 by a link 109, (see Fig. 1,) and said lever turns upon the pivot-stud 97 and has a roller 110 entering a cam-groove 111 in the front face of the disk $q$, and said cam-groove is shaped to give the movements to the fingers 99 hereinafter described.

*The presser-bars and devices for actuating the same.*—112, Figs. 5, 8, and 9, is a presser-bar for pressing back upon the table B the signatures as sewed, and said presser-bar is fastened to the ends of rack-bars 113, which rack-bars slide in guide-blocks 106 and 114. 115 is a rock-shaft supported in bearings upon said head $d$, and 116 116 are toothed segments upon said shaft 115 and meshing with the racks 113. 117, Figs. 2 and 9, is a crank-arm fastened to said shaft 115, and 118 is a link one end of which is connected to said crank-arm 117 and its other end is connected to a vertical rod 119, fitted to slide in a guide upon the bed $a$. The lower end of said rod 119 rests upon the periphery of a cam 120 on the shaft $k$, and there is a spring 135 around said rod, (see Fig. 5 and dotted lines, Fig. 2,) which spring forces down the rod 119 when allowed to do so by the cam 120, and during this downward movement of said rod 119 the toothed segments 116 are turned and the racks 113 are moved, carrying the presser-bar away from the signatures, so as to make room for the signature-bar carrying the signature to be sewed, and when said cam lifts the rod 119 the rack-bars are moved in the reverse direction and the presser-bar pushes back upon the discharge-galley the signature last sewed.

*Guides for the threads of the sewing-needles and loopers.*—The spools of thread for the sewing-needles and loopers are upon a frame 121, Figs. 1 and 2, supported upon the head $d$, and the threads 122 for the sewing-needles each pass from its spool through a hole in a plate 123, secured to said frame 121, thence between a spring tension-plate 124 and said plate 123 and through a second hole in said plate 123, thence over a rod 125, through an eye in a spring take-up 126, over rods 127 and 128, and down to the sewing-needle. The looper-threads 129 each pass from its spool through a hole in the plate 123, then between the spring tension-plate 124 and the plate 123 and through a second hole in said plate 123, thence over the rod 125, through an eye on the spring take-up 130, over the rods 127 128, and down to the looper.

*The sewing operation.*—When a signature is taken from the discharge-galley by the signature-bar $v$, as before described, it is carried upward by said bar until the fold of the signature is in contact with a stripping-plate 132, that is secured to the under side of the needle-block 81, and said plate is slotted for the passage of the sewing-needles and the take-up fingers 99, as shown in Figs. 12, 13, 14, and 15. As the sewing operation is the same with all the needles, we will only describe it in connection with one needle.

Referring to Fig. 12, which shows the sewing-needle, the looper, and the take-up finger in the position each occupies after a signature has been sewed, the needle-thread 122 passes from the signature last sewed to the eye of the needle 79, and there is a loop of needle-thread also from the signature last sewed around the looper 90. The looper-thread 129 passes around the looper in the groove thereof, goes through the eye of the looper, and back through the loop of needle-thread on said looper to said last-sewed signature. As soon as the presser-bar 112 has pushed said last-sewed signature upon the table and moved back the finger 99 is swung from the position shown in Fig. 12 to that shown in Fig. 13 and holds said last-sewed signature back at the same time said finger catches in its notch the thread passing from the signature to the needle. Supposing now that there is a signature in place upon the signature-holding bar $v$, the needle 79 passes down through an opening in the stripping-plate 132, pierces the signature, passes between the two parts of the signature, again pierces the signature, and the point of the needle passes up through a second opening in the stripping-plate and between the looper and looper-thread, as indicated in Fig. 13. The needle 79 remains now stationary, while the looper 90 swings from the position shown in Fig. 13 to that of Fig. 14, and in so doing the looper passes out of the loop of needle-thread that was around the same, at which time the take-up 99 swings to the left of Fig. 13 and draws this loop of needle-thread down tight and then swings back to the position shown in Fig. 14. The looper and the take-up remain in the position shown in Fig. 14, while the needle 79 completes its upward movement and stops in the position shown in Fig. 15. The looper now swings to the position shown in Fig. 15, and in so doing passes through a loop of needle-thread, and the needle 79 in completing its upward movement, as aforesaid, takes up the slack of the needle-thread that the take-up left by swinging back and also draws the signatures together, which can be done, because the take-up finger is not between the signatures. The needle 79 now makes its return movement, leaving a loop of needle-thread around the looper, the looper remaining stationary, and at the completion of its movement said needle, looper, and take-up are in the position shown in Fig. 12 and a stitch completed. The signature-holding bar drops after the needle has made its upward pierce in the signature and before the take-up swings to the left, so as to permit of the slack needle-thread being drawn taut by the take-up and the signatures being drawn together, as above mentioned. The presser-bar 112 now pushes back the sewed signature and moves away therefrom, and the take-up finger is then swung down to the position shown in Fig. 8 and holds said sewed signature in place.

In order to prevent the needle 79 being strained when piercing the signature, we provide rollers at 133 in the signature-holding bar $v$ and rollers at 134 in the needle-block 81 to support the needle as it passes through the grooved portion of said needle-block and signature-holding bar. We prefer to provide two of said rollers in the needle-block and two in the signature-holding bar for each needle, and they are so placed that the periphery of the needle contacts with the peripheries of said rollers during the movements of said needle. Hence the needle is kept from bending as it makes its downward and upward pierce, and as the rollers turn by the contact of the needle they offer no resistance to the passage of the needle. We may employ only one roller 133 in the signature-holding bar $v$ and one in the needle-block 81. In this case the rollers employed will be those nearest the places where the needle pierces the signature.

The stitch-forming mechanism hereinbefore described and illustrated in the drawings is not claimed herein, as the same forms the subject of a separate application for patent filed by us January 17, 1902, Serial No. 90,161.

We claim as our invention—

1. In a book-sewing machine, the combination with a receptacle for holding the signatures to be sewed and an endless belt and pulleys for moving the signatures along progressively toward the place of delivery, of a shaft 23 supported by said receptacle, a toothed segment upon said shaft, a toothed segment loose upon the shaft of one of said pulleys and meshing with the segment first named, a ratchet-wheel fixed to said pulley-shaft, and a spring-pawl upon the loose toothed segment, engaging said ratchet, and means for rocking the shaft 23, to give the progressive movement to the endless belt, substantially as set forth.

2. In a book-sewing machine, the combination with a receptacle for holding the signatures to be sewed and an endless belt and pulleys for moving the signatures along progressively toward the place of delivery, of a shaft 23 supported by said receptacle, a toothed segment upon said shaft, a toothed segment loose upon the shaft of one of said pulleys and meshing with the toothed segment first named, a ratchet-wheel fixed to said pulley-shaft, a spring-pawl carried by said loose toothed segment and engaging said ratchet-wheel, a second toothed segment upon said shaft 23, a rack meshing with the toothed segment last named, a rod fitted to slide vertically to which said rack is secured, and means for raising and lowering said rod so as to rotate said shaft 23, substantially as set forth.

3. In a book-sewing machine, the combination with a receptacle for holding the signatures to be sewed and an endless belt and pulleys for moving the signatures along progressively toward the place of delivery, of a shaft 23 supported by said receptacle, the toothed segments 24 and 25 upon said shaft 23, the toothed segment 27 loose upon the pulley-shaft, the ratchet-wheel 32 fixed upon said shaft 28, a spring-pawl carried by the toothed segment 27 and engaging said ratchet-wheel, the rod 30, the rack 29 secured to said rod, and meshing with the segment 25, a lever connected to the lower end of said rod and a cam acting upon said lever, substantially as set forth.

4. In a book-sewing machine, a signature-receptacle for holding the signatures to be sewed, having a bottom portion upon which the front cut edges of the signatures rest, a guide-rail against which the folded top edges of the signatures bear, a post connected to the bottom portion of the receptacle for supporting the outer end of said rail and to which post the rail is pivoted, a second post 12 also connected to said bottom portion for supporting the inner end of said guide-rail, the upper end of said latter post passing through an elongated hole in the guide-rail, and means for clamping said guide-rail to said second post, substantially as set forth.

5. In a book-sewing machine, the combination with the signature-receptacle, a sucker to act successively upon said signatures, and a signature-holding bar to pass between the two parts of a signature as opened out by the sucker, of a shaft supported at the delivery end of said receptacle, fingers secured to said shaft for holding back the signatures upon said receptacle, and means for turning said shaft and swinging said fingers down to allow the sucker to bend out one half of the folded signature and then swinging said fingers upward against the other part of the opened signature and hold it while the sheet-holding bar passes into said opened signature, substantially as set forth.

6. In a book-sewing machine, the combination with the signature-receptacle, a sucker to act successively upon the signatures, and a signature-holding bar to pass between the two parts of a signature as opened out by the sucker, of a shaft supported at the delivery edge of the receptacle, fingers secured to said shaft for holding back the signatures upon the receptacle, a toothed segment upon said shaft, a rack meshing with said segment, a bar fitted to slide vertically to which said rack is secured, and means for raising and lowering said rod and turning said shaft and fingers, substantially as and for the purposes set forth.

7. In a book-sewing machine, the combination with the signature-receptacle, a sucker to act successively upon the signatures, and a signature-holding bar to pass between the two parts of a signature as opened out by the sucker, of a shaft supported at the delivery edge of the receptacle, fingers secured to said shaft for holding back the signatures upon the receptacle, a toothed segment upon said shaft, a rack meshing with said segment, a bar fitted to slide vertically to which said rack is secured, a lever connected to the lower end of said rod and a cam acting upon said lever, substantially as and for the purposes set forth.

8. In a book-sewing machine, the combination with a signature-receptacle for holding the signatures to be sewed, a signature-holding bar, a sucker, means for opening and closing the exhaust to the sucker and supporting-bars to which the sucker is pivoted, of means for moving forward said sucker and its supporting-bars until the sucker is brought parallel with and contacts with the signature to be taken away, means for swinging back the sucker upon its pivots while the supporting-bars are held substantially stationary so that the sucker carries with it the outer folded half of the signature below the pivot-shaft of the sucker before the sucker and supporting-bars move back together, and means for holding back the other half of the folded signature, so that the signature-bar can freely enter the opened signature, substantially as set forth.

9. In a book-sewing machine, the combination with the receptacle for holding the signatures to be sewed, a signature-holding bar, horizontally-movable supports and a sucker pivotally supported therefrom, and means for actuating such supports, of coacting means for actuating the sucker so that it is moved forward with its supports, then swung and brought parallel with the signature to be taken away, and then swung back to open the signature while the supports remain substantially stationary and act to keep back the signatures at a point above the sucker for the entrance of the signature-holding bar into the open signature, and then moving back the sucker with its supports, and means for controlling the action of the sucker, substantially as set forth.

10. In a book-sewing machine, the combination with the receptacle for holding the signatures to be sewed, a signature-holding bar, horizontally-movable supports and a sucker pivotally supported therefrom, and means for actuating such supports, of coacting means for actuating the sucker so that it is moved forward with its supports, then swung and brought parallel with the signature to be taken away, and then swung back to open the signature while the supports remain substantially stationary and act to keep back the signatures at a point above the sucker for the entrance of the signature-holding bar into the open signature and then moving back the sucker with its supports, and means for opening and closing the exhaust to the sucker while the sucker is moving, substantially as set forth.

11. In a book-sewing machine, the combination with the signature-receptacle and a signature-holding bar, of a sucker, bars to which the sucker is pivoted, a rock-shaft, arms secured to said rock-shaft, links pivoted to said arms and to said supporting-bars, a link pivoted at one end to the sucker, an arm on said rock-shaft to which the other end of said last-named link is pivoted, and means for actuating said rock-shaft, substantially as set forth.

12. In a book-sewing machine, the combination with the signature-receptacle, and a signature-holding bar, of a sucker, bars to which the sucker is pivoted, a rock-shaft, arms secured to said rock-shaft, links pivoted to said arms and to said supporting-bars, a link pivoted at one end to the sucker, an arm on said rock-shaft to which the other end of said last-named link is pivoted, a toothed segment upon said rock-shaft, a rack meshing with said toothed segment, a rod to which said rack is secured, and means for raising and lowering said rod and rack, substantially as set forth.

13. In a book-sewing machine, the combination with a sucker, supports for the sucker and means for moving the sucker and its supports forward and holding the supports substantially stationary while the sucker is swinging back and then moving the sucker and supports back together, of a valve-cylinder and valve, tubular connections between the sucker and the cylinder, and means for raising and lowering the valve to open and close the exhaust to the sucker, substantially as set forth.

14. In a book-sewing machine, the combination with a sucker, supports for the sucker and means for moving the sucker and its supports forward and holding the supports substantially stationary while the sucker is swinging back and then moving the sucker and supports back together, of a valve-cylinder and valve, tubular connections between the sucker and the cylinder, a rod to which said valve is connected, an arm connected to said valve-rod, a spring between said arm and the valve-cylinder, a vertical rod connected to said arm, and means for raising said rods and arm, substantially as set forth.

15. In a book-sewing machine, the combination with the signature-holding bar, the sewing mechanism, a presser-bar and means for actuating said parts, of a table upon which the sewed signatures are pushed by said presser-bar, a shaft supported by said table and near the front edge thereof, fingers secured to said shaft, a toothed segment secured to said shaft, a rack with which said toothed segment meshes, a vertical rod to which said rack is secured, and means for vertically raising and lowering said rod, substantially as and for the purposes set forth.

16. In a book-sewing machine, the combination with the signature-holding bar, the sewing mechanism, a presser-bar and means for actuating said parts, of a table upon which the sewed signatures are pushed by said presser-bar, a shaft supported by said table and near the front edge thereof, fingers secured to said shaft, a toothed segment secured to said shaft, a rack with which said toothed segment meshes, a vertical rod to which said rack is secured, a link connected to said rod, a bent lever to which the other end of said link is connected, and a cam acting upon said bent lever, substantially as set forth.

Signed by us this 29th day of August, 1901.

DAVID McCONNELL SMYTH. [L. S.]
  DAVID G. SMYTH. [L. S.]
  HERBERT HASTINGS. [L. S.]

Witnesses:
 FRANK S. FLAGG,
 ARTHUR W. BOOTH.